United States Patent
Galbraith et al.

(10) Patent No.: US 6,879,629 B2
(45) Date of Patent: Apr. 12, 2005

(54) METHOD AND APPARATUS FOR ENHANCED TIMING LOOP FOR A PRML DATA CHANNEL

(75) Inventors: Richard Leo Galbraith, Rochester, MN (US); David James Stanek, Rochester, MN (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 696 days.

(21) Appl. No.: 09/804,094

(22) Filed: Mar. 12, 2001

(65) Prior Publication Data

US 2002/0126749 A1 Sep. 12, 2002

(51) Int. Cl.$^7$ ............................................... H03H 7/40
(52) U.S. Cl. .................. 375/231; 375/327; 375/355; 375/362; 370/503; 348/537
(58) Field of Search .................... 375/251, 324–327, 375/354, 355, 360, 362, 372; 370/503; 348/536, 537, 542, 500

(56) References Cited

U.S. PATENT DOCUMENTS

| 4,890,299 A | * 12/1989 | Dolivo et al. ............... 375/290 |
| 5,258,933 A | 11/1993 | Johnson et al. |
| 5,384,671 A | 1/1995 | Fisher |
| 5,416,806 A | 5/1995 | Coker et al. |
| 5,426,541 A | 6/1995 | Coker et al. |
| 5,552,942 A | 9/1996 | Ziperovich et al. |
| 5,754,352 A | * 5/1998 | Behrens et al. ............... 360/51 |
| 5,841,664 A | 11/1998 | Cai et al. |
| 5,959,837 A | 9/1999 | Yu |
| 6,587,529 B1 | * 7/2003 | Staszewski et al. ......... 375/371 |

FOREIGN PATENT DOCUMENTS

EP          0 701 255 A2     3/1996

* cited by examiner

*Primary Examiner*—Dac V. Ha
(74) *Attorney, Agent, or Firm*—Joan Pennington

(57) ABSTRACT

Methods and apparatus for enhanced timing loop are provided for a partial-response maximum-likelihood (PRML) data channel in a direct access storage device (DASD). An acquisition timing circuit for generating an acquisition timing signal includes a plurality of compare functions for receiving and comparing consecutive input signal samples on an interleave with a threshold value. The acquisition timing circuit includes a majority rule voting function coupled to the plurality of compare functions for selecting a timing interleave. Tracking timing circuitry for generating a timing error signal during a read operation includes a channel data detector. The channel data detector receives disk signal input samples and includes a multiple-state path memory. The tracking timing circuit includes a low latency detector receiving disk signal input samples. A selector function is coupled to an output of the low latency detector and is coupled to the multiple-state path memory for selecting a state. The selector function utilizes the low latency detector output and selects the state of the path memory. The selector function provides a low latency output corresponding to the selected state. The low latency output is used for generating the timing error signal during a read operation.

20 Claims, 5 Drawing Sheets

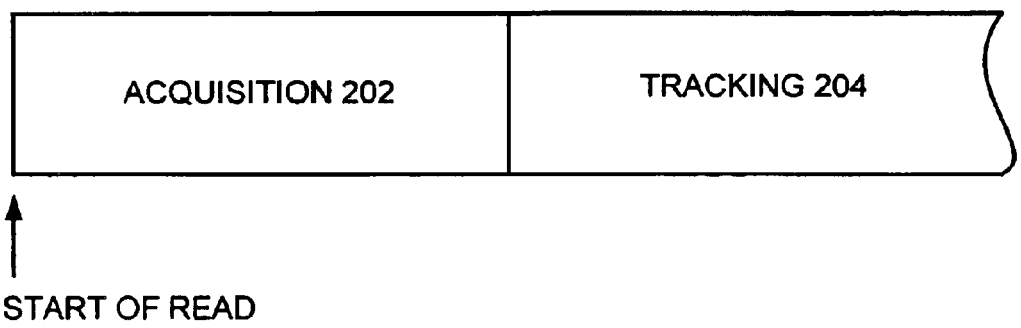
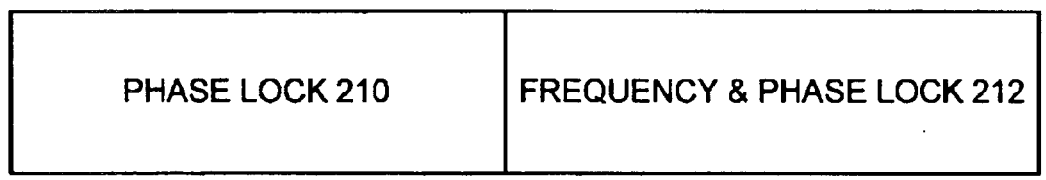
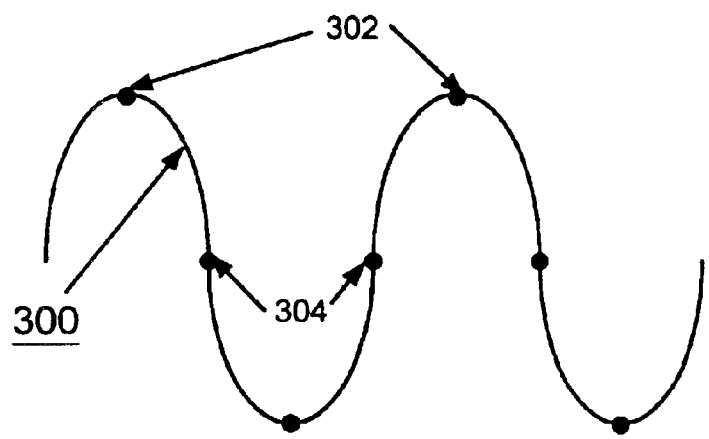

METHOD AND APPARATUS FOR ENHANCED TIMING LOOP FOR A PRML DATA CHANNEL

FIELD OF THE INVENTION

The present invention relates generally to the data processing field, and more particularly, relates to a method and apparatus for enhanced timing loop for a partial-response maximum-likelihood (PRML) data channel in a direct access storage device (DASD).

DESCRIPTION OF THE RELATED ART

Disk drive units often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A partial-response maximum-likelihood (PRML) data detection channel advantageously is used to achieve high data density in writing and reading digital data on the disks. PRML data channels in DASD units are synchronous data detection channels where synchronous refers to the frequency and phase locking of the channel to the readback signal in order to detect the data properly.

Known data channels incorporate sophisticated timing loop algorithms to perform clock recovery during acquisition at the beginning of a read operation, and to keep the clock in synchronization during tracking for the remainder of the read operation. Problems with both the acquisition and tracking timing loop algorithms have resulted as data channel detector improvements have allowed for lower operational signal to noise ratios (SNRs). Timing loop improvements in the noise robustness arena have not kept pace, causing performance problems at low SNR due to the timing loops.

A need exists for methods and apparatus for enhanced timing loop for a partial-response maximum-likelihood (PRML) data channel. It is desirable to provide such methods and apparatus for enhanced timing loop for a partial-response maximum-likelihood (PRML) data channel that provide improved performance in the presence of low SNR and that are effective, efficient and simple to implement.

SUMMARY OF THE INVENTION

A principal object of the present invention is to provide improved methods and apparatus for enhanced timing loop for a partial-response maximum-likelihood (PRML) data channel. Other important objects of the present invention are to provide such methods and apparatus for enhanced timing loop for a partial-response maximum-likelihood (PRML) data channel substantially without negative effect and that overcome many of the disadvantages of prior art arrangements.

In brief, methods and apparatus for enhanced timing loop are provided for a partial-response maximum-likelihood (PRML) data channel in a direct access storage device (DASD). An acquisition timing circuit for generating an acquisition timing signal includes a plurality of compare functions for receiving and comparing consecutive input signal samples on an interleave with a threshold value. The acquisition timing circuit includes a majority rule voting function coupled to the plurality of compare functions for selecting a timing interleave.

Tracking timing circuitry for generating a timing error signal during a read operation includes a channel data detector. The channel data detector receives disk signal input samples and includes a multiple-state path memory. The tracking timing circuit includes a low latency detector receiving disk signal input samples. A selector function is coupled to an output of the low latency detector and is coupled to the multiple-state path memory for selecting a state. The selector function utilizes the low latency detector output and selects the state of the path memory. The selector function provides a low latency output corresponding to the selected state. The low latency output is used for generating the timing error signal during a read operation.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are diagrams illustrating acquisition and tracking portions of a readback signal in the PRML data channel in accordance with the preferred embodiment;

FIG. 3 is a diagram illustrating an exemplary readback sync field signal used for implementing methods for enhanced timing loop in accordance with the preferred embodiment;

DETAILED DESCRIPTION OF THE PREFERRED EMBODIMENTS

Figure 1:
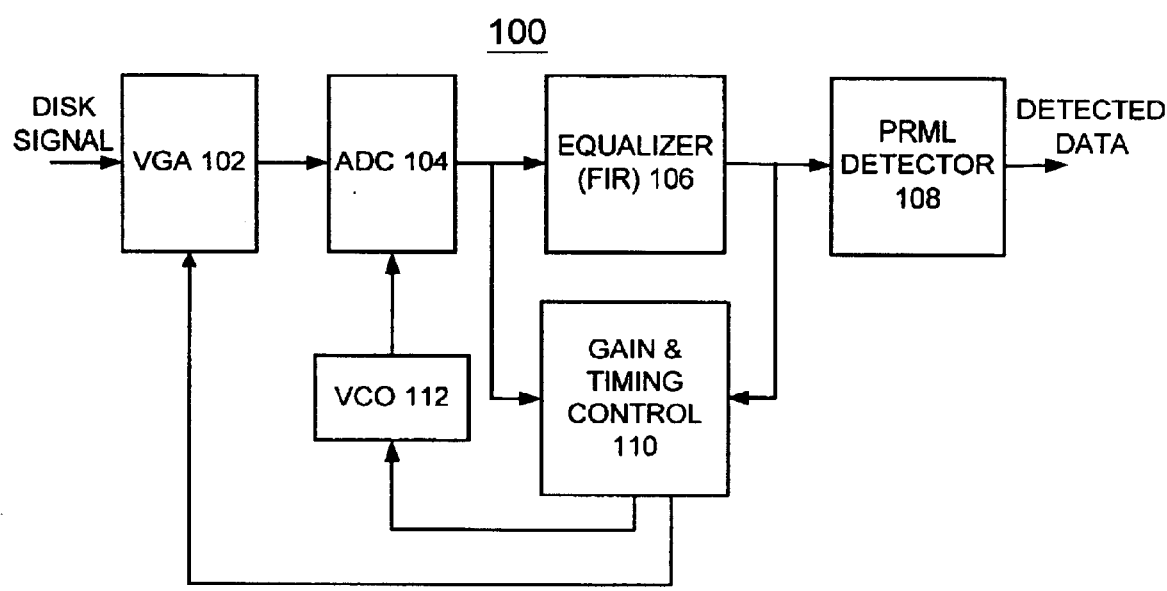
FIG. 1 is a block diagram representation illustrating a PRML data channel for implementing methods for enhanced timing loop in accordance with the preferred embodiment.

Having reference now to the drawings, in FIG. 1, there is shown a PRML data channel for implementing methods for enhanced timing loop in accordance with the preferred embodiment generally designated by the reference character 100. As shown in FIG. 1 in the PRML data channel 100, a read signal is applied to a variable gain amplifier (VGA) 102 and the amplified read signal is applied to an analog-to-digital converter (ADC) 104 that provides, for example, such as 64 possible 6-bit sampled values. The samples of the ADC 104 are applied to an equalizer 106, such as a 10 tap finite impulse response (FIR) digital filter. The filtered signal from the digital filter 106 is a class IV partial response (PR4) signal. The PR4 signal is input to two parallel paths. The filtered PR4 signal from the digital filter 106 is applied to a PRML detector 108, such as illustrated and described with respect to FIG. 7. The PRML detector 108 provides a detected data output. The filtered PR4 signal from the digital filter 106 and the samples of the ADC 104 are applied to a gain and timing control 110 of the preferred embodiment. Gain and timing control 110 of the preferred embodiment provides a timing control signal to a voltage controlled oscillator (VCO) 112 coupled to the ADC 104. Gain and timing control 110 provides a gain control signal to the VGA 102. Gain and timing control 110 of the preferred embodiment includes an acquisition timing circuit as illustrated and described with respect to FIG. 5 and tracking timing circuitry as illustrated and described with respect to FIGS. 6 and 7.

FIGS. 2A and 2B illustrates a readback operation 200 in the PRML data channel 100 including an acquisition portion or mode 202 and a tracking portion or mode 204 in accordance with the preferred embodiment. When the data channel 100 begins a read operation, first the channel clock or VCO 112 must be synchronized to the input disk signal. As shown in FIG. 2B, the acquisition mode 202 includes a first phase lock mode 210 followed by a frequency and phase lock mode 212.

Referring also to FIG. 3, there is shown an exemplary readback sync field signal generally designated by the reference character 300 used for implementing methods for enhanced timing loop in accordance with the preferred embodiment. Sync field signal 300 is used for performing clock recovery during the acquisition mode 202. Sync field signal 300 is a sine wave with a frequency equal to ¼ of the clock rate. At the start of acquisition, the channel ADC 104 will be sampling the sync field signal 300 at an arbitrary and unknown phase, and at the end of acquisition, the channel ADC 104 will be sampling the sync field signal 300 on peaks 302 and zeros 304, as shown in FIG. 3. The zero samples 304 contain timing information, since the amplitude of these samples changes rapidly with any timing error. The peak samples 302 contain gain information, since the amplitude of these samples changes rapidly with any gain error. Thus, the acquisition algorithm uses two interleaves of samples, one for timing and the other for gain.

Figure 4:
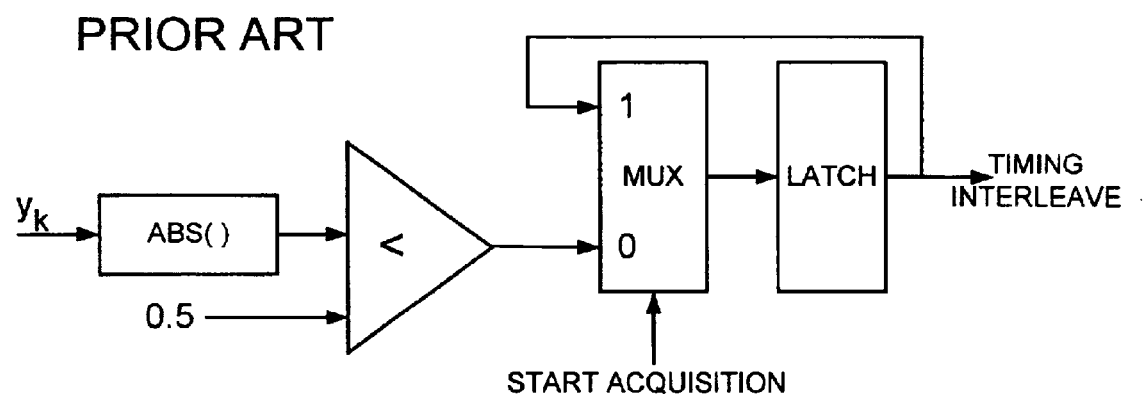
FIG. 4 is a block diagram illustrating a portion of a known acquisition timing circuit.

FIG. 4 illustrates a portion of a prior art acquisition timing circuit where the timing interleave is chosen based on a single sample $y_k$. An absolute value of the input sample is taken by an absolute value function ABS( ) and compared with a threshold value 0.5 by a compare function <to identify whether the sample $y_k$ is closer to a peak 302 or a zero 304. If the sample $y_k$ is closer to being a peak 302, the interleave for that sample is deemed the gain interleave and the other interleave becomes the timing interleave. If the sample $y_k$ is closer to being a zero 304, then the interleave for that sample is deemed the timing interleave and the other interleave becomes the gain interleave. In an ideal situation, the timing algorithm would only have to shift the phase of the clock ½ cycle due to this choice.

A significant problem in the current disk drive environment where the input signal is often noisy is the chance that the opposite timing interleave is selected. That is the single sample is deemed the timing interleave due to the noisy input signal when it is in fact the gain interleave. This requires the timing algorithm to shift the phase of the clock a full cycle, which takes longer than the time allotted so that acquisition fails.

Figure 5:
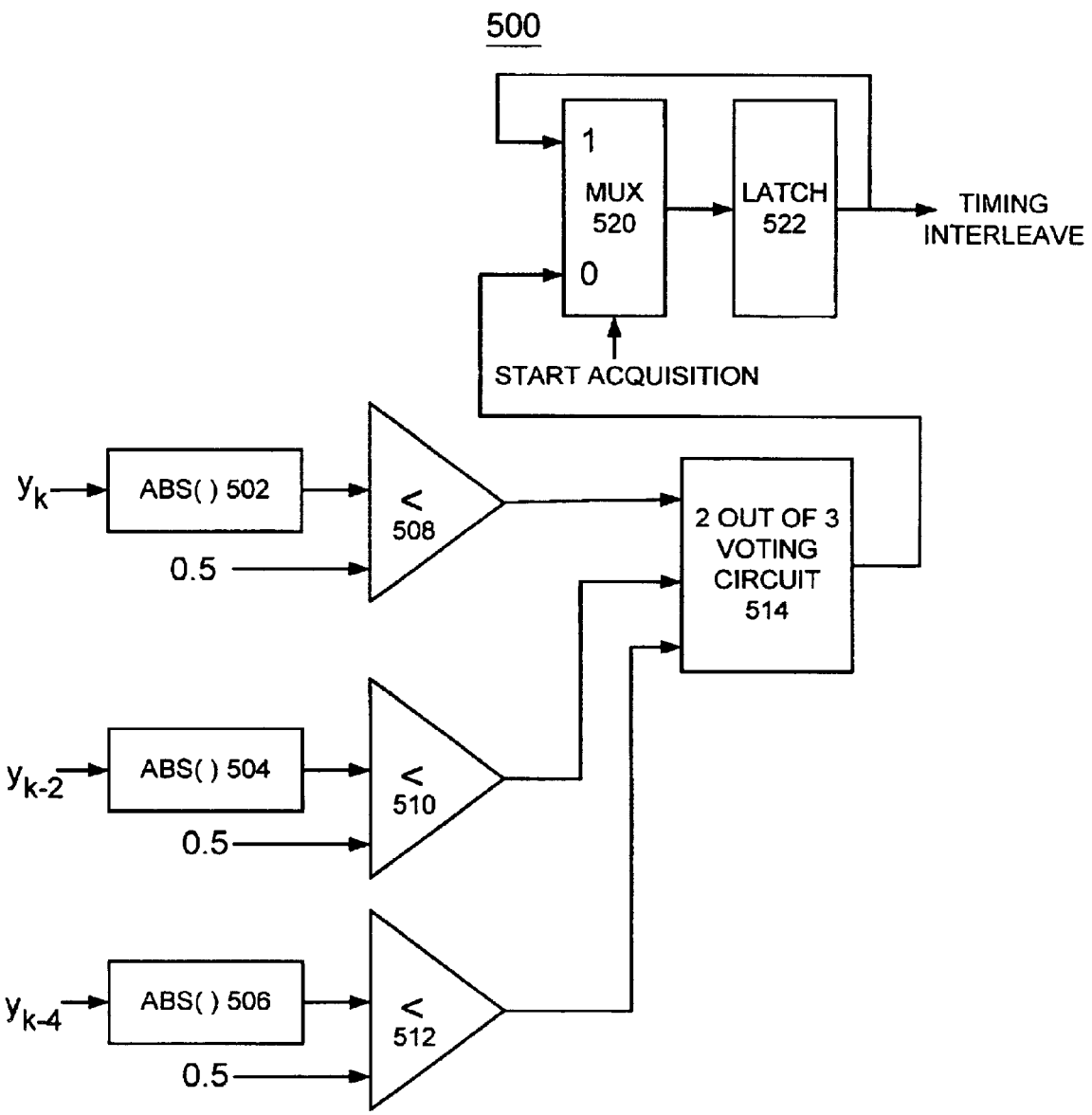
FIG. 5 is a block diagram illustrating an acquisition timing circuit in accordance with the preferred embodiment.

In accordance with features of the preferred embodiment, an enhanced acquisition timing circuit as illustrated and described with respect to FIG. 5 provides significantly improved robustness over the prior art arrangements, such as shown in FIG. 4. The enhanced acquisition timing algorithm of the preferred embodiment uses multiple consecutive samples on an interleave, such as three consecutive samples on an interleave, determining whether each sample is closer to a peak 302 or a zero 304. Then majority rule voting, such as a two out of three voting scheme, is used to determine the timing interleave.

FIG. 5 illustrates an acquisition timing circuit generally designated by the reference character 500 in accordance with the preferred embodiment. Acquisition timing circuit 500 is shown in simplified form sufficient for an understanding of the invention. Acquisition timing circuit 500 receives multiple consecutive samples on an interleave $y_k$, $y_{k-2}$, and $y_{k-4}$ and an absolute value of each input sample is taken by a respective absolute value function ABS( ) 502, 504, 506. Each absolute sample values is compared with a threshold value 0.5 by a respective compare function 508, 510, 512 to identify whether each sample $y_k$, $y_{k-2}$, and $y_{k-4}$ is closer to a peak 302 or a zero 304. The outputs of the compare functions 508, 510, 512 are applied to a majority rule voting function 514, such as two out of three voting function as shown, selecting a timing interleave. The output of majority rule voting function 514 is applied to an input of a multiplexer 520 having its output coupled to a latch 522. A timing interleave output of the latch is connected to a second input of the multiplexer 520. Acquisition timing circuit 500 significantly improves robustness of the acquisition timing algorithm in the presences of noise with a small increase in the length of acquisition for receiving the multiple consecutive samples on an interleave $y_k$, $y_{k-2}$, and $y_{k-4}$. However, the increased length of acquisition for the acquisition timing circuit 500 is not nearly as much as allowing for a full cycle phase correction as may be required for the conventional timing algorithm.

Figure 6:
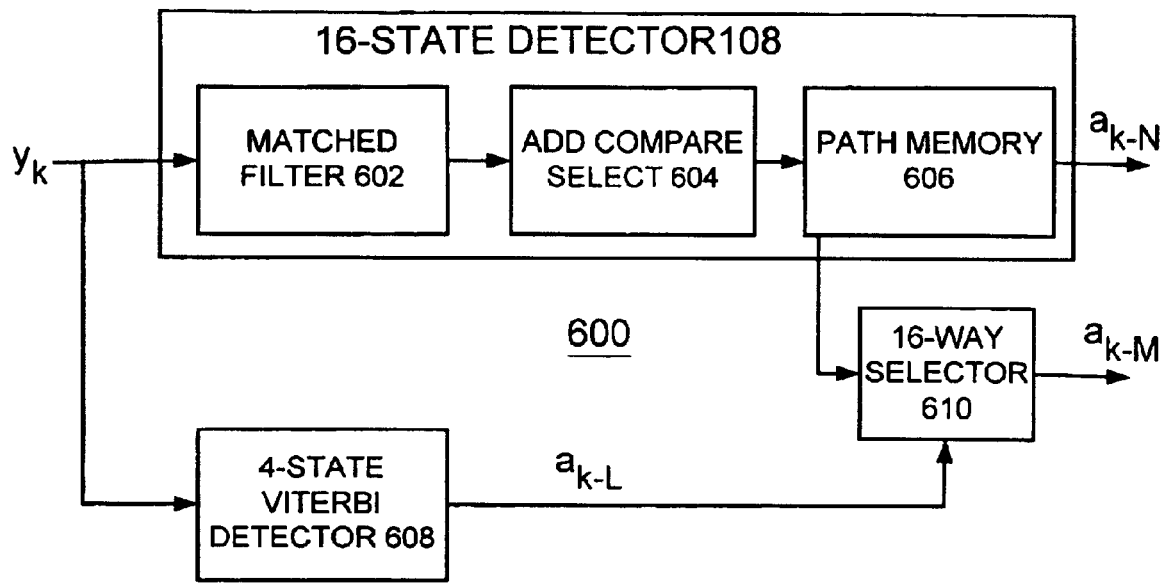
FIGS. 6 and 7 are block diagrams illustrating a tracking timing circuit in accordance with the preferred embodiment.
Figure 7:
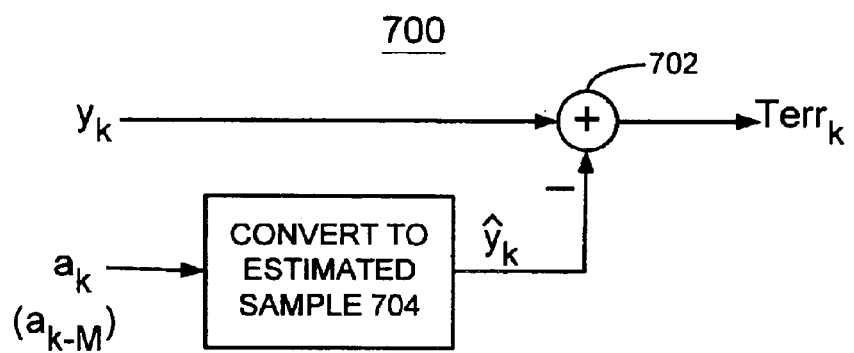

FIGS. 6 and 7 illustrate tracking timing circuitry generally designated by the respective reference characters 600 and 700 in accordance with the preferred embodiment. Tracking timing circuitry 600 and 700 is shown in simplified form sufficient for an understanding of the invention. While the data channel 100 is performing a read operation, the channel clock must be synchronized to the input read signal. To accomplish this, timing error information shown as $Terr_k$ in FIG. 7 must be generated based on the data being read. This timing error signal $Terr_k$ is applied by the tracking timing algorithm for applying corrections to the VCO 112 to keep the clock in synchronization during tracking for the remainder of the read operation.

In accordance with features of the preferred embodiment, the enhanced tracking timing circuitry 600 and 700 minimizes the latency in generating the timing error signal $Terr_k$ for optimum timing loop performance. In conventional arrangements, the timing error is determined using the output of the data detector in the PRML data channel. In recent data channels, the data detector has become extremely sophisticated with capability of accurately reading data at very poor signal to noise ratios. One of the problems with such sophistication of the data detector is an extremely long latency, or delay from samples in to detected data out. This long latency makes the conventional tracking timing arrangements that use the output of the data detector unacceptably poor. Enhanced tracking timing circuitry 600 and 700 solves this problem.

Enhanced tracking timing circuitry 600 includes the data detector 108, such as a 16-state detector including a matched filter 602, an add compare select 604 and a multiple-state path memory 606. Data detector 108 receives an input $y_k$ from the FIR filter 106 and provides an output $a_{k-N}$ at the output of path memory 606. A lower latency detector 608, such as 4-state PR4 Viterbi detector receives the input $y_k$ and provides a low latency output $a_{k-L}$. The output $a_{k-L}$ of detector 608 is unacceptable to generate timing error because the PR4 detector's error rate is extremely poor at current high user bit densities. The output $a_{k-L}$ of detector 608 is applied to a 16-way selector 610. The 16-way selector 610 is coupled to the path memory 606 of the data detector 108. The 16-way selector 610 utilizes the output $a_{k-L}$ of detector 608 to selects which state in the path memory 606 to choose. The 16-way selector 610 to pull the data out from an early or low latency state in the path memory 606 of the detector 108 applies a simplified best metric selection algorithm. Operation of the 16-way selector 610 significantly reduces the latency without a severe error rate penalty. The 16-way selector 610 uses the low latency PR4 Viterbi detector output to select the low latency state of the path memory 606 for providing an output $a_{k-M}$, where L<M<N. The output $a_{k-M}$ is used for generating a timing error in accordance with the preferred embodiment.

Referring to FIG. 7, the timing error $Terr_k$ in accordance with the preferred embodiment is generated by applying the input $y_k$ from the FIR filter 106 to an adder 702. The output $a_{k-M}$ of the 16-way selector 610 is applied to a convert-to-estimated-sample function 704 for generating an estimated sample output $\hat{y}_k$. Convert-to-estimated-sample function 704 applies the estimated sample output $\hat{y}_k$ to the adder 702 where the estimated sample output $\hat{y}_k$ is subtracted from the input $y_k$ by adder 702 to generate the timing error Terrk.

While the present invention has been described with reference to the details of the embodiments of the invention shown in the drawing, these details are not intended to limit the scope of the invention as claimed in the appended claims.

What is claimed is:

1. Apparatus for enhanced timing loop for a partial-response maximum-likelihood (PRML) data channel in a direct access storage device (DASD) comprising:

an analog to digital converter (ADC) for converting an input signal to sample values;

an acquisition timing circuit coupled to said ADC for receiving sample values from said ADC and for generating an acquisition timing signal;

said acquisition timing circuit including a plurality of compare functions for receiving and comparing consecutive input signal samples on an interleave with a threshold value; each said compare function including an absolute value function for taking an absolute value of each input sample and said compare function for comparing a respective absolute value with said threshold value;

said acquisition timing circuit including a majority rule voting function coupled to said plurality of compare functions for selecting a timing interleave for said acquisition timing signal.

2. Apparatus for enhanced timing loop for a partial-response maximum-likelihood (PRML) data channel as recited in claim 1 wherein said acquisition timing circuit includes three compare functions for receiving and comparing three consecutive input signal samples on said interleave with said threshold value.

3. Apparatus for enhanced timing loop for a partial-response maximum-likelihood (PRML) data channel as recited in claim 2 wherein said majority rule voting function includes a two of three voting function coupled to said plurality of compare functions for selecting said timing interleave.

4. Apparatus for enhanced timing loop for a partial-response maximum-likelihood (PRML) data channel as recited in claim 1 further includes tracking timing circuitry for generating a timing error signal during a read operation.

5. Apparatus for enhanced timing loop for a partial-response maximum-likelihood (PRML) data channel as recited in claim 4 wherein said tracking timing circuitry includes a channel data detector, said channel data detector receiving disk signal input samples and including a multiple-state path memory.

6. Apparatus for enhanced timing loop for a partial-response maximum-likelihood (PRML) data channel as recited in claim 5 wherein said tracking timing circuitry further includes a low latency detector receiving disk signal input samples.

7. Apparatus for enhanced timing loop for a partial-response maximum-likelihood (PRML) data channel as recited in claim 6 wherein said tracking timing circuitry further includes a selector function coupled to an output of said low latency detector and coupled to said multiple-state path memory for selecting a state and utilizing said low latency detector output to select a state of said path memory and said selector function providing a low latency output corresponding to said selected state.

8. Apparatus for enhanced timing loop for a partial-response maximum-likelihood (PRML) data channel as recited in claim 7 wherein said low latency output is used for generating said timing error signal during a read operation.

9. Apparatus for enhanced timing loop for a partial-response maximum-likelihood (PRML) data channel as recited in claim 7 wherein said low latency output is applied to a convert-to-estimated sample function for generating an estimated sample and said estimated sample subtracted from said disk signal input samples for generating said timing error signal during a read operation.

10. A method for enhanced timing loop for a partial-response maximum-likelihood (PRML) data channel in a direct access storage device (DASD) comprising the steps of:

receiving and comparing multiple consecutive input signal samples on an interleave with a threshold value;

applying a majority rule voting function and selecting a timing interleave for an acquisition timing signal;

during a read operation, applying disk signal input samples to a channel data detector and to a low latency data detector; said channel data detector including a multiple-state path memory;

utilizing an output of said low latency detector for selecting a state of said multiple-state path memory and providing a low latency output corresponding to said selected state; and utilizing said low latency output for generating said timing error signal during said read operation.

11. A method for enhanced timing loop for a partial-response maximum-likelihood (PRML) data channel as recited in claim 10 wherein the step of receiving and comparing multiple consecutive input signal samples on an interleave with a threshold value includes the step of receiving and comparing three consecutive input signal samples on said interleave with said threshold value.

12. A method for enhanced timing loop for a partial-response maximum-likelihood (PRML) data channel as recited in claim 11 includes the step of identifying a zero or a one value for said three consecutive input signal samples.

13. A method for enhanced timing loop for a partial-response maximum-likelihood (PRML) data channel as recited in claim 10 wherein the step of applying a majority rule voting function and selecting a timing interleave for an acquisition timing signal includes the step of applying a two out of three voting function and selecting said timing interleave for said acquisition timing signal.

14. A method for enhanced timing loop for a partial-response maximum-likelihood (PRML) data channel as recited in claim 10 wherein the step of utilizing an output of said low latency detector for selecting a state of said multiple-state path memory and providing a low latency output corresponding to said selected state includes the step of selecting a low latency state of said multiple-state path memory and providing said low latency output.

15. A method for enhanced timing loop for a partial-response maximum-likelihood (PRML) data channel as recited in claim 10 wherein the step of utilizing said low latency output for generating said timing error signal during said read operation includes the steps of converting said low latency output to an estimated sample output and subtracting said estimated sample output from said disk signal input samples for generating said timing error signal during said read operation.

16. Apparatus for enhanced timing loop for a partial-response maximum-likelihood (PRML) data channel in a direct access storage device (DASD) comprising:

tracking timing circuitry for generating a timing error signal during a read operation; said tracking timing circuit including a channel data detector, said channel data detector receiving disk signal input samples and including a multiple-state path memory;

said tracking timing circuit including a low latency detector receiving disk signal input samples;

said tracking timing circuit including a selector function coupled to an output of said low latency detector and coupled to said multiple-state path memory for selecting a state and said selector function utilizing said low latency detector output for selecting said state of said path memory and for providing a low latency output corresponding to said selected state; and said low latency output being used for generating said timing error signal during a read operation.

17. Apparatus for enhanced timing loop for a partial-response maximum-likelihood (PRML) data channel as recited in claim 16 includes a convert-to-estimated sample function receiving said low latency output and generating an estimated sample and said estimated sample subtracted from said disk signal input samples for generating said timing error signal during a read operation.

18. Apparatus for enhanced timing loop for a partial-response maximum-likelihood (PRML) data channel as recited in claim 16 wherein said low latency detector includes a 4-state Viterbi detector.

19. Apparatus for enhanced timing loop for a partial-response maximum-likelihood (PRML) data channel as recited in claim 16 wherein said low latency output is less than a latency of an output of said channel data detector.

20. Apparatus for enhanced timing loop for a partial-response maximum-likelihood (PRML) data channel as recited in claim 16 includes an acquisition timing circuit for generating an acquisition timing signal; said acquisition timing circuit including a plurality of compare functions for receiving and comparing consecutive input signal samples on an interleave with a threshold value, and a majority rule voting function coupled to said plurality of compare functions for selecting a timing interleave.

* * * * *